US005114769A

United States Patent [19]

Kani et al.

[11] Patent Number: 5,114,769

[45] Date of Patent: * May 19, 1992

[54] RESIN MOLD CLUTCH FACING

[75] Inventors: Harunobu Kani, Toyota; Kenji Kakihara, Okazaki, both of Japan

[73] Assignee: Toyota Jidosha Kabushiki Kaisha, Toyota, Japan

[ * ] Notice: The portion of the term of this patent subsequent to Mar. 24, 2009 has been disclaimed.

[21] Appl. No.: 469,680

[22] Filed: Jan. 25, 1990

Related U.S. Application Data

[63] Continuation of Ser. No. 155,059, Feb. 11, 1988, abandoned.

[30] Foreign Application Priority Data

Feb. 18, 1987 [JP] Japan .................................. 62-35371

[51] Int. Cl.[5] .......................... B32B 5/02; D04H 3/02; F16D 11/00; F16D 13/00

[52] U.S. Cl. .................................. 428/37; 188/251 A; 192/107 M; 428/65; 428/137; 428/222; 428/284; 428/285; 428/286; 428/287; 428/298; 428/302; 428/323; 428/340

[58] Field of Search .................... 192/107 M; 428/323, 428/65, 357, 288, 284, 285, 286, 287, 298, 302, 138, 37, 222, 137, 340; 188/251 A, 251 M

[56] References Cited

U.S. PATENT DOCUMENTS 4,244,994 1/1981 Trainor et al. ........................ 428/65
4,349,595 9/1982 Trainor et al. .
4,476,256 12/1982 Hamermesh .
4,656,203 4/1987 Parker ............................ 523/152 X
4,663,368 5/1987 Harding et al. ................. 523/152 X
4,735,975 4/1988 Iwata et al. ......................... 523/152

FOREIGN PATENT DOCUMENTS

A2129022 12/1984 European Pat. Off. .
A2154488 9/1985 European Pat. Off. .
1128359 9/1968 United Kingdom .
1128360 9/1968 United Kingdom .
1207087 9/1970 United Kingdom .
1290553 9/1972 United Kingdom .
1545081 5/1979 United Kingdom .
2056369A 3/1981 United Kingdom .

OTHER PUBLICATIONS

U.S. Ser. No. 095,444, filed Sep. 11, 1987, "Process For Manufacturing A Molded Friction Component Member, In Which Grinding is Not A Required Operation".
U.S. Ser. No. 087,405, filed Aug. 20, 1987, "Molded Resin Composition of Frictional Material For Use In Clutches".

*Primary Examiner*—Lorraine T. Kendell
*Attorney, Agent, or Firm*—Finnegan, Henderson, Farabow, Garrett & Dunner

[57] ABSTRACT

Disclosed is a resin mold clutch facing integrally heat molded out of a resin mold base member and a reinforcement member. The resin mold base member comprises a matrix composed of a glass fiber and an aromatic polyamide fiber, an inorganic filler, a solid lubricant, and a resin. The reinforcement member comprises a matrix composed of a glass strand or yarn and at least one strand or yarn selected from a group of rayon and an aromatic polyamide strand or yarn and a binder adhered to said matrix, and is shaped in a spirally wound configuration. Thus the weight of the resin mold clutch facing has been reduced, and its friction and anti-wear properties have been improved.

10 Claims, 2 Drawing Sheets

MIXING OF MATRIX, INORGANIC FILLER, SOLID LUBRICANT & RESIN

PRE-MOLDING

PRE-MOLDED RESIN MOLD BASE MEMBER

ADHERING BINDER TO MATRIX

SPINNING, TWISTING & WINDING SPIRALLY

SPIRALLY WOUND REINFORCEMENT MEMBER

HEAT-MOLDING (MOLDING INTEGRALLY)

RESIN MOLD CLUTCH FACING

GRINDING

HEAT TREATMENT

IF NECESSARY

○—○: EMBODIMENT
△—△: COMPARATIVE EXAMPLE A
×—×: COMPARATIVE EXAMPLE B

RESIN MOLD CLUTCH FACING

This application is a continuation of application Ser. No. 07/155,059 filed Feb. 11, 1988 is now abandoned.

BACKGROUND OF THE INVENTION

1. Field of the Invention

This invention relates to an improvement on a clutch facing of a clutch disk, used in an automobile, for connecting and disconnecting power transmission, and particularly relates to a resin mold clutch facing having lower specific gravity, high strength, and good friction and anti-wear properties at a high temperature.

2. Discussion of the Background

An automobile employs a clutch facing as one of the components of a clutch disk for connecting and disconnecting the power transmission between the engine and the gearbox.

As the clutch facing, a resin mold clutch facing, a woven clutch facing, and a semi-mold clutch facing are known.

The resin mold clutch facing is formed by heating and pressurizing the following materials after mixing and filling the materials in a mold. The materials are an inorganic fiber, such as asbestos, a carbon fiber, and a glass fiber, or a composite fiber in which an organic fiber like a polyamide fiber is compounded in said inorganic fiber, a thermosetting resin as a binder, a rubber, a vulcanizing agent, and a friction regulating agent.

The woven clutch facing is formed by heating and pressurizing a matrix after cutting the matrix into pieces having an appropriate shape and laminating the pieces into a desired circle configuration. The matrix is a felt-shaped, a mat-shaped, or a woven-shaped aforementioned fiber. A liquid mixture of a thermosetting resin as a binder, a rubber, a vulcanizing agent, and a friction regulating agent is impregnated into the matrix.

The semi-mold clutch facing is formed also by heating and pressurizing after treating the aforementioned materials as follows. The aforementioned fiber is made into a string shape. A liquid mixture including a binder is impregnated into the string shaped fiber. The string shaped fiber is wound in a spiral shape, and molded into a desired shape.

We, the inventors of the present invention, had proposed an improvement on a friction component member of a resin mold clutch facing under Japanese Patent Application No. 202188/1986, now Japanese Unexamined Patent Publication (KOKAI) No. 57930/1988. The resin mold clutch facing showed a reduced attack tendency against the mating component by employing a matrix whose surface is covered with an inorganic filler and a rubber.

We had also proposed under Japanese Patent Application No. 204655/1986, now Japanese Unexamined Patent Publication (KOKAI) No. 62925/1988 that a friction component member having an improved friction coefficient and a reduced attack tendency against the mating component could be obtained by adding zirconium silicate by from 0.1 to 0.5 volume % as one of the inorganic filler components.

We had further proposed under Japanese Patent Application No. 214527/1986, now Japanese Unexamined Patent Publication (KOKAI) No. 69833/1988 that a manufacturing process for a friction component member having an improved anti-wear property and fading property, in which grinding was not a required operation. In the manufacturing process, the following materials were heat-molded under a pressure of from 200 to 400 $kgf/cm^2$ and then heat-treated. The materials were a matrix fiber having a fiber diameter of 50 micrometers or less, a resin binder, an organic material like a rubber, and an inorganic filler having a grain diameter of 50 micrometers or less. The composition ratio of the organic material flowing during the molding operation was from 20 to 30% by volume based on 100% by volume of the total friction component member contained in the composition.

We intend to provide a clutch facing having a further reduced weight and improved friction property in the present invention.

OBJECT OF THE INVENTION

As many of automobiles have been equipped with the four-wheel drive transmission system, and many high geared components are employed in the transmission system, the clutch facing has to be light-weighted and its friction and anti-wear properties at a high temperature are also required to be improved. Accordingly, it is an object of the present invention to provide a light-weighted clutch facing having an improved friction property as well as an improved anti-wear property at a high temperature.

SUMMARY OF THE INVENTION

A resin mold clutch facing of the present invention is integrally heat molded out of a resin mold base member and a reinforcement member. The resin mold base member comprises a matrix composed of a glass fiber and an aromatic polyamide fiber, an inorganic filler, a solid lubricant, and a resin. The reinforcement member comprises a matrix composed of a glass strand or yarn and at least one strand or yarn selected from a group of rayon and an aromatic polyamide strand or yarn, and a binder adhered to the matrix, and is shaped in a spirally wound configuration.

The matrix of the resin mold base member of the present invention is composed of a glass fiber and an aromatic polyamide fiber. The fiber configuration employed in the matrix is usually a short fiber. In order to reduce the weight of the resin mold base member, it is not preferred to use metals, which have been employed in the conventional resin mold clutch facings, in the matrix of the resin mold base member of the present invention. It is preferred that the apparent density of the resin mold clutch facing of the present invention falls in the range of from 1.50 to 1.70 $g/cm^3$ to satisfy the light-weight requirement.

An aromatic polyamide fiber is used along with a glass fiber to reduce the weight of the resin mold base member and give strength to the resin mold base member. Thus the resin mold base member is light-weighted and strength is given to it by adding an aromatic polyamide fiber having a lighter specific gravity than that of a glass fiber. It is preferred to use a glass fiber from 20 to 40 weight % based on the total weight of the resin mold base member, and an aromatic polyamide fiber from 15 to 25 weight % based on the total weight of the resin mold base member.

As the inorganic filler, zirconium silicate improving friction and anti-wear properties and calcium hydroxide improving anti-rust property are used. In addition to zirconium silicate and calcium hydroxide, diatomaceous earth, clay, alumina and calcium carbonate are used as a regulating agent. It is preferred to use zirconium silicate for improving friction and anti-wear property from 2 to 10 weight % based on the total weight of the resin mold base member, and calcium hydroxide for improving anti-rust propery from 0.5 to 5 weight % based on the total weight of the resin mold base member. And the amount of the other filler is preferred to be the balance after subtracting the matrix, resin, solid lubricant weight percentages, and the aforementioned zirconium silicate and calcium hydroxide weight percentages from the total weight of the resin mold base member as 100 weight %.

As the solid lubricant, graphite, molybdenum disulfide, lead sulfide, and antimony trisulfide may be used. However, it is most preferred to use a granular graphite in an amount from 1.5 to 5 weight % based on the total weight of the resin mold base member.

The resin works as a binder for the resin mold base member. As the resin, a thermosetting resin, such as a phenol resin, a phenoxy resin, an epoxy resin, and an unsaturated polyester resin may be used. It is preferred to use a phenol resin in an amount from 15 to 25 weight % based on the total weight of the resin mold base member.

As shown in a schematic block diagram in FIG. 1 illustrating the manufacturing process of the resin mold clutch facing of the present invention, the resin mold base member is heat-molded integrally with the reinforcement member in a mold after mixing the aforementioned matrix, inorganic filler, solid lubricant and resin, and pre-molding the mixture. Or the resin mold base member is heat-molded integrally with the reinforcement member after placing the reinforcement member at a predetermined position in a mold and filling the resin mold base member in the mold.

The reinforcement member comprises a matrix composed of a glass strand or yarn and at least one strand or yarn selected from the group of rayon and an aromatic polyamide strand or yarn. The matrix is twisted into a string-shape, and a binder is adhered to the matrix. And then, the matrix is shaped in a spirally wound configuration. For instance, a binder composed of a mixture of a phenol resin and a rubber is impregnated into the matrix to adhere the aforementioned string-shaped strand or yarn fiber. The binder increases the binding force of the string and renders the reinforcement member flexible.

In the reinforcement member of the present invention, a certain amount of the glass strand or yarn is substituted by at least one strand or yarn selected from the group of rayon and an aromatic polyamide strand or yarn in order to reduce the weight in accordance with the light-weight requirement and improve the affinity with the binder. The reinforcement member may be composed of from 40 to 60 weight % of a glass strand or yarn based on the total weight of the reinforcement member as 100 weight %, from 10 to 30 weight % of at least one strand or yarn, based on the total weight of the reinforcement member as 100 weight %, selected from a group of rayon and an aromatic polyamide strand or yarn, from 5 to 15 weight % of a phenol resin based on the total weight of the reinforcement member as 100 weight %, and from 15 to 35 weight % of a rubber component based on the total weight of the reinforcement member as 100 weight %.

The reinforcement member is kept, for instance, integrally with the resin mold base member in a mold under a heated and pressurized condition to form a resin mold clutch facing. If necessary, the substance thus molded is ground and heat-treated to obtain a resin mold clutch facing.

ADVANTAGES OF THE INVENTION

The resin mold clutch facing of the present invention is integrally heat molded out of the resin mold base member and the reinforcement member. The resin mold base member comprises a matrix composed of a glass fiber and an aromatic polyamide fiber, an inorganic filler, a solid lubricant, and a resin. The reinforcement member comprises a matrix composed of a glass strand or yarn and at least one strand or yarn selected from a group of rayon and an aromatic polyamide strand or yarn, and a binder adhered to said matrix, and is shaped in a spirally wound configuration.

The weight of the resin mold clutch facing according to the present invention has been reduced because a certain amount of glass fiber, which is a main composition of the resin mold base member of the conventional resin mold clutch facing, has been substituted by the aromatic polyamide fiber having a low specific gravity and high strength. Moreover, the strength of the resin mold clutch facing has been further increased because the reinforcement member comprises a matrix composed of a glass strand or yarn and at least one strand or yarn selected from a group of rayon and an aromatic polyamide strand or yarn, and a binder adhered to said matrix, and is shaped in a spirally wound configuration after the strands or yarns have been spinned and twisted.

Thus the resin mold clutch facing of the present invention has been light-weighted, and its friction and anti-wear properties have been improved by the aforementioned arrangements accompanied by the addition of the appropriate fillers.

DETAILED DESCRIPTION OF THE PREFERRED EMBODIMENT

Figure 1:
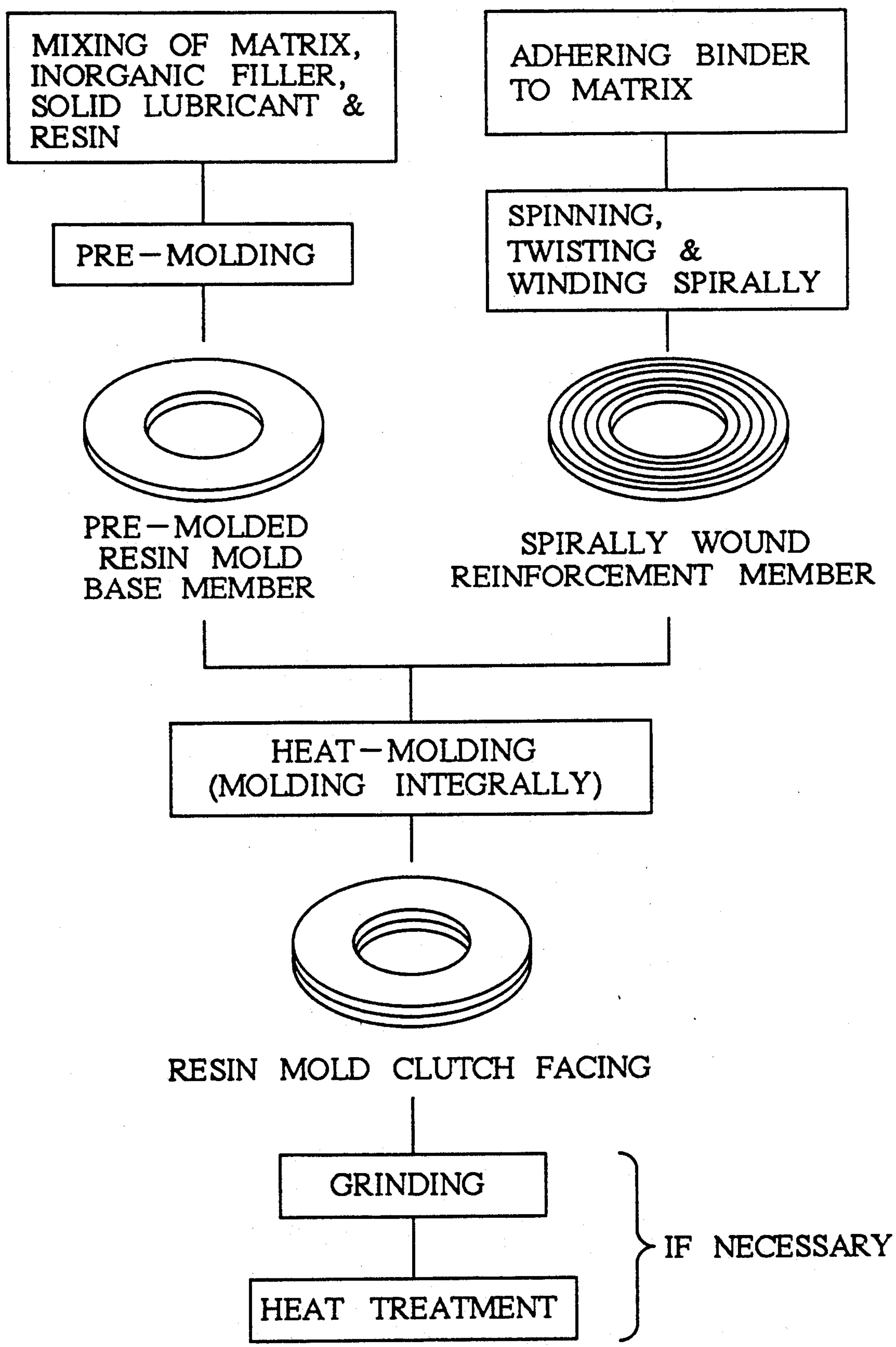
FIG. 1 is a schematic block diagram illustrating the manufacturing process of a resin mold clutch facing according to the present invention.

The present invention will be hereinafter explained with reference to a preferred embodiment. Unless otherwise specified, percentages appearing in the following description mean the percentage by weight.

PREFERRED EMBODIMENT

An example of the preferred embodiment (hereinafter referred to as Embodiment) was manufactured as follows:

Resin Mold Base Member Preparation

The following materials were mixed and pre-molded in a mold for molding a resin mold base member having the outside diameter of 236 mm and the thickness of 5 mm.:

from 20 to 40% of a glass fiber having the diameter of 10 micrometers and the length of 3 mm and from 15 to 25% of #29 Kevlar (trade mark) fiber having the diameter of 12 micrometers and the length of 2 mm as an aromatic polyamide fiber composing a matrix, from 2 to 10% of zirconium silicate having the average grain diameter of 1 micrometer, from 0.5 to 5% of calcium hydroxide having the average grain diameter of 5 micrometers, and from 15 to 35% of calcium carbonate having the average grain diameter of 1 micrometer and barium sulfate having the average grain diameter of 0.8 micrometers composing an inorganic filler, from 5 to 10% of a granular graphite having the average grain diameter of 400 micrometers as a solid lubricant, from 15 to 25% of a phenol resin as a resin.

Reinforcement Member Preparation

A mixture as a binder of from 5 to 15% of a phenol resin and from 10 to 30% of styrene-butadiene rubber (hereinafter referred to as SBR) was impregnated into a matrix composed of from 40 to 60% of glass strand or yarn roving having the diameter of 10 micrometers, and from 20 to 30% of an aromatic polyamide strand or yarn having the diameter of 12 micrometers. Then, the matrix was spinned and twisted to obtain a string. And then, the string was spirally wound to form a reinforcement member. Thus made reinforcement member had the outside diameter of 336 mm and the thickness of 10 mm.

Molding

The molding was performed at the temperature of 150° C. and under the pressure of 200 kgf/cm for 5 minutes after integrally placing the resin mold base member and the reinforcement member in a mold. Thus, the resin mold base member and the reinforcement member were bound and disposed integrally to obtain a resin mold clutch facing having the outside diameter of 236 mm and the thickness of 3.5 mm.

COMPARATIVE EXAMPLE A

In Comparative Example A, 30% of a glass fiber having the diameter of 6 micrometers and the length of 1.5 mm, 20% of barium sulfate having the average grain diameter of 1 micrometer as an inorganic filler and 5% of granular graphite having the average grain diameter of 400 micrometers as a solid lubricant, 35% of SBR and 10% of a phenol resin were mixed and molded at the temperature of 160° C. and under the pressure of 110 kgf/cm$^2$ for 5 minutes. Thus obtained molded substance was a semi-mold clutch facing having the outside diameter of 236 mm and the thickness of 3.5 mm.

COMPARATIVE EXAMPLE B

Comparative Example B was also a semi-mold clutch facing having the outside diameter of 236 mm and the thickness of 3.5 mm. It differed from Comparative Example A in that the amount of the glass fiber was slightly increased to 35% and the vulcanization rate of SBR was increased. Comparative Example B had the same composition as Comparative Example A except the above mentioned differences.

Evaluation

The apparent density, the revolution per minute (rpm) at burst, and the critical temperature for the minimum friction coefficient were measured for the three clutch facings, namely Embodiment of the present invention, Comparative Example A and Comparative Example B. The results are shown in the table below.

| | Apparent Density (g/cm$^3$) | RPM at Burst (at 200° C.) | Critical Temp. for Min. $\mu$ |
|---|---|---|---|
| Embodiment | 1.62 | Did Not Burst at 17,000 rpm or more | 400° C. or more |
| Comparative Example A | 1.72 | Burst at 12,500 rpm | 350° C. |
| Comparative Example B | 1.80 | Burst at 13,000 rpm | 300° C. |

The apparent density of Embodiment was 1.62 g/cm$^3$ which was lighter than those of Comparative Example A and Comparative Example B.

Embodiment did not burst at 17000 rpm or more, but Comparative Examples A and B burst at 12500 rpm and 13000 rpm respectively.

Figure 2:
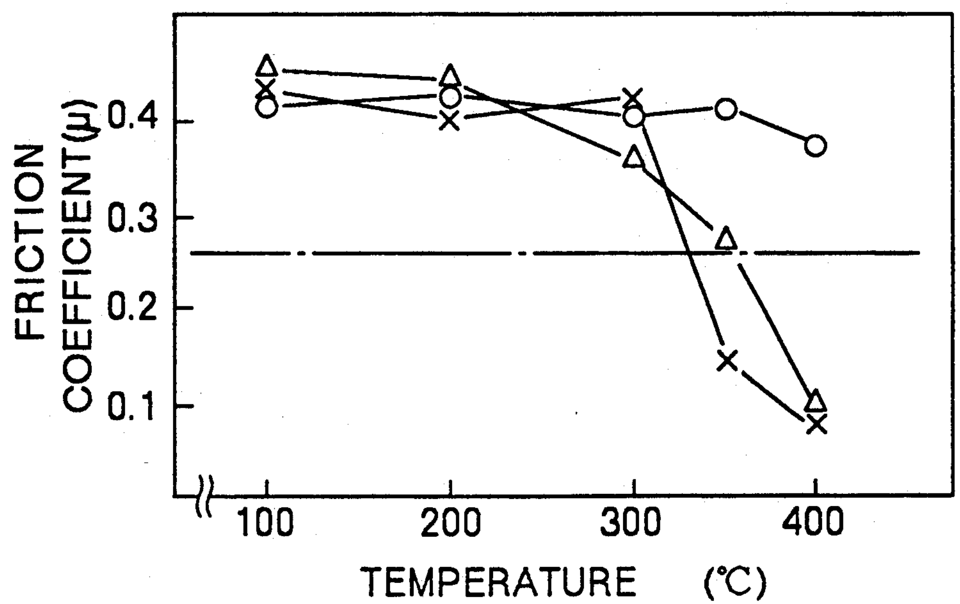
FIG. 2 is a graph showing the relationships between temperatures and friction coefficients obtained by using a clutch dynamometer.

Embodiment showed 400° C. or more of the critical temperature for the minimum friction coefficient ($\mu$), though Comparative Examples A and B showed 300° C. and 350° C. of the critical temperature for the minimum friction coefficient ($\mu$) respectively. This friction property at a high temperature was measured by a clutch dynamometer under the following conditions, and the results are shown in FIG. 2:

Moment of Inertia: 0.4 kgfms$^2$

Revolution: 1500 rpm

Testing Temperature: 100° C., 200° C., 300° C., 350° C., and 400° C.

Number of Clutchings: after 500 times of breaking-in, 200 times of clutchings at each testing temperature

What is claimed is:

1. A resin mold clutch facing integrally heat molded out of a resin mold base member and a reinforcement member, wherein,
   - said resin mold base member consists essentially of a matrix composed of a mixture of short fibers, an inorganic filler, a solid lubricant, and a thermosetting resin binder;
   - said reinforcement member consists essentially of a matrix composed of a string-shaped strand or yarn roving and a binder resin containing a rubber component and adhered to said matrix of said reinforcement member, said matrix of said reinforcement member being shaped in a spirally wound configuration, and said reinforcement member being integrally heat molded with said resin mold base member.

2. A resin mold clutch facing according to claim 1, wherein said matrix of said resin mold base member is composed of from 20 to 40 weight % of a glass fiber and from 15 to 25 weight % of an aromatic polyamide fiber based on the total weight of said resin mold base member.

3. A resin mold clutch facing according to claim 1, wherein said inorganic filler of said resin mold base member is composed of from 2 to 10 weight % of zirconium silicate and from 0.5 to 5 weight % of calcium hydroxide based on the total weight of said resin mold base member.

4. A resin mold clutch facing according to claim 1, wherein said solid lubricant of said resin mold base member is a granular graphite in an amount of from 1.5 to 5 weight % based on the total weight of said resin mold base member.

5. A resin mold clutch facing according to claim 1, wherein said resin of said resin mold base member is a phenol resin in an amount of from 15 to 25 weight % based on the total weight of said resin mold base member.

6. A resin mold clutch facing according to claim 1, wherein said reinforcement member is composed of from 40 to 60 weight % of a glass strand or yarn, from 10 to 30 weight % of at least one strand or yarn selected from a group of rayon and an aromatic polyamide strand or yarn, 5 to 15 weight % of a phenol resin, and from 15 to 35 weight % of a rubber component based on the total weight of said reinforcement member.

7. A resin mold clutch facing according to claim 1, wherein the apparent density of said resin mold clutch facing falls in the range of from 1.50 to 1.70 g/cm$^3$.

8. A resin mold clutch facing integrally heat molded out of a resin mold base member and a reinforcement member, wherein said resin mold base member comprises a molded matrix composed of a mixture having from 20 to 40 weight % of short glass fibers and from 15 to 25 weight % of short aromatic polyamide fibers, an inorganic filler composed of from 2 to 10 weight % of zirconium silicate, from 0.5 to 5 to weight % of calcium hydroxide, and from 15 to 35 weight % of calcium carbonate and barium sulfate, from 5 to 10 weight % of a granular graphite, and from 15 to 25 weight % of a phenol resin, based on the total weight of a said resin mold base member; and said reinforcement member comprises a string-shaped matrix composed of, based on the total weight of said reinforcement member, from 40 to 60 weight % of glass strand or yarn roving and from 20 to 30 weight % of an aromatic polyamide strand or yarn, a mixture of from 5 to 15 weight % of a phenol resin and from 10 to 30 weight % of styrene-butadiene rubber adhered to said matrix of said reinforcement member, said matrix of said reinforcement member being shaped in a spirally wound configuration, and said reinforcement member being integrally heat molded with said resin mold base member.

9. A resin mold clutch facing according to claim 8, wherein the apparent density of said resin mold clutch facing falls in the range of from 1.50 to 1.70 g/cm$^3$.

10. A resin mold clutch facing integrally heat molded out of a resin mold base member and a reinforcement member, wherein said resin mold base member consists essentially of a molded matrix composed of a mixture of short glass fibers and aromatic polyamide fibers, an inorganic filler, a solid lubricant, and a resin binder wherein said resin is selected from the group consisting of phenol resins, phenoxy resins, epoxy resins and unsaturated polyester resins; and said reinforcement member consists essentially of a matrix composed of a string-shaped mixture of glass strand or yarn roving and an aromatic polyamide strand or yarn, and a binder resin containing a rubber component and adhered to said matrix of said reinforcement member, said matrix of said reinforcement member being shaped in a spirally wound configuration, and said reinforcement member being integrally heat molded with said resin mold base member.

* * * * *